United States Patent
Hatano et al.

(10) Patent No.: US 7,358,632 B2
(45) Date of Patent: Apr. 15, 2008

(54) MOTOR WHICH PERFORMS A ROTATIONAL-TO-LINEAR MOTION CONVERSION

(75) Inventors: Kenta Hatano, Tokyo (JP); Youichi Fujita, Tokyo (JP); Sotsuo Miyoshi, Tokyo (JP); Tomokuni Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/474,964

(22) Filed: Jun. 27, 2006

(65) Prior Publication Data

US 2006/0238046 A1   Oct. 26, 2006

Related U.S. Application Data

(62) Division of application No. 10/893,317, filed on Jul. 19, 2004, now Pat. No. 7,205,690.

(30) Foreign Application Priority Data

Jul. 18, 2003 (JP) .......................... P.2003-199218

(51) Int. Cl.
    H02K 5/10    (2006.01)
    H02K 7/06    (2006.01)
(52) U.S. Cl. .................... 310/80; 310/88; 310/49 R; 251/129.11; 123/568.24; 123/588
(58) Field of Classification Search .............. 310/80, 310/88, 89, 49 R, 12; 251/129.11, 129.07; 123/339.26, 588, 568.24, 568.21
See application file for complete search history.

(56) References Cited

U.S. PATENT DOCUMENTS

| 4,412,517 | A | * | 11/1983 | Kobashi et al. | 123/339.26 |
| 4,782,811 | A | * | 11/1988 | Hewette et al. | 123/568.24 |
| 4,825,840 | A | * | 5/1989 | Hewette et al. | 123/568.24 |
| 5,184,593 | A | * | 2/1993 | Kobayashi | 123/568.24 |
| 5,220,224 | A | * | 6/1993 | Bosman et al. | 310/49 R |
| 5,298,822 | A | * | 3/1994 | Bosman et al. | 310/49 R |
| 5,351,935 | A | * | 10/1994 | Miyoshi et al. | 251/129.11 |
| 5,784,922 | A | * | 7/1998 | Ozaki et al. | 74/89.37 |
| 6,089,536 | A | * | 7/2000 | Watanabe et al. | 251/129.11 |
| 6,193,211 | B1 | * | 2/2001 | Watanabe et al. | 251/129.11 |
| 6,224,034 | B1 | * | 5/2001 | Kato et al. | 251/164 |
| 6,227,183 | B1 | * | 5/2001 | Miyoshi et al. | 123/568.23 |
| 6,325,055 | B1 | * | 12/2001 | Yokoyama et al. | 123/568.24 |
| 6,365,994 | B1 | * | 4/2002 | Watanabe et al. | 310/49 R |

(Continued)

FOREIGN PATENT DOCUMENTS

CN   1310876   8/2001

(Continued)

OTHER PUBLICATIONS

Translation of Ikeda et al. (JP 08-049785); Feb. 20, 1996; "Motor Driven Valve Stem Linking Mechanism",□□.*

(Continued)

*Primary Examiner*—Tamai I Karl
(74) *Attorney, Agent, or Firm*—Sughrue Mion, PLLC

(57) ABSTRACT

A sliding hole is formed so that a screw portion can pass therethrough. Also, a seal member is provided at a portion, through which the screw portion placed in the sliding hole can pass and in which a sliding portion does not slide.

12 Claims, 15 Drawing Sheets

U.S. PATENT DOCUMENTS

| | | | |
|---|---|---|---|
| 6,412,753 B2 * | 7/2002 | Fujita et al. | 251/129.11 |
| 6,453,891 B2 * | 9/2002 | Kato et al. | 123/568.24 |
| 6,473,958 B2 * | 11/2002 | Miyoshi et al. | 29/557 |
| 6,672,293 B1 * | 1/2004 | Yokoyama et al. | 123/568.21 |
| 6,708,675 B2 * | 3/2004 | Kato et al. | 123/568.12 |
| 6,737,771 B2 * | 5/2004 | Fujita et al. | 310/68 B |
| 6,806,597 B2 * | 10/2004 | Kondo | 310/49 R |
| 2001/0037800 A1 * | 11/2001 | Watanabe et al. | 123/568.24 |
| 2001/0054417 A1 * | 12/2001 | Kato et al. | 123/568.23 |
| 2002/0008219 A1 * | 1/2002 | Yokoyama et al. | 251/129.11 |
| 2004/0070292 A1 * | 4/2004 | Fujita et al. | 310/71 |
| 2005/0012415 A1 * | 1/2005 | Hatano et al. | 310/80 |
| 2005/0199847 A1 * | 9/2005 | Hatano et al. | 251/129.15 |

FOREIGN PATENT DOCUMENTS

| | | | |
|---|---|---|---|
| DE | 197 30 111 C2 | | 8/1998 |
| DE | 100 03 129 A1 | | 8/2001 |
| JP | 4-105541 | | 4/1992 |
| JP | 05071655 | * | 3/1993 |
| JP | 6-141502 A | | 5/1994 |
| JP | 7-55012 A | | 3/1995 |
| JP | 7-274472 A | | 10/1995 |
| JP | 08-049785 | * | 2/1996 |
| JP | 09-032654 | * | 2/1997 |
| JP | 11030356 | * | 2/1999 |
| JP | 11-124668 | * | 9/1999 |
| JP | 11-241668 | * | 9/1999 |

OTHER PUBLICATIONS

Translation of Okura et al. (JP 11-241668; Sep. 7, 1999, "Stepper Motor Type Flow Control Valve".*

* cited by examiner

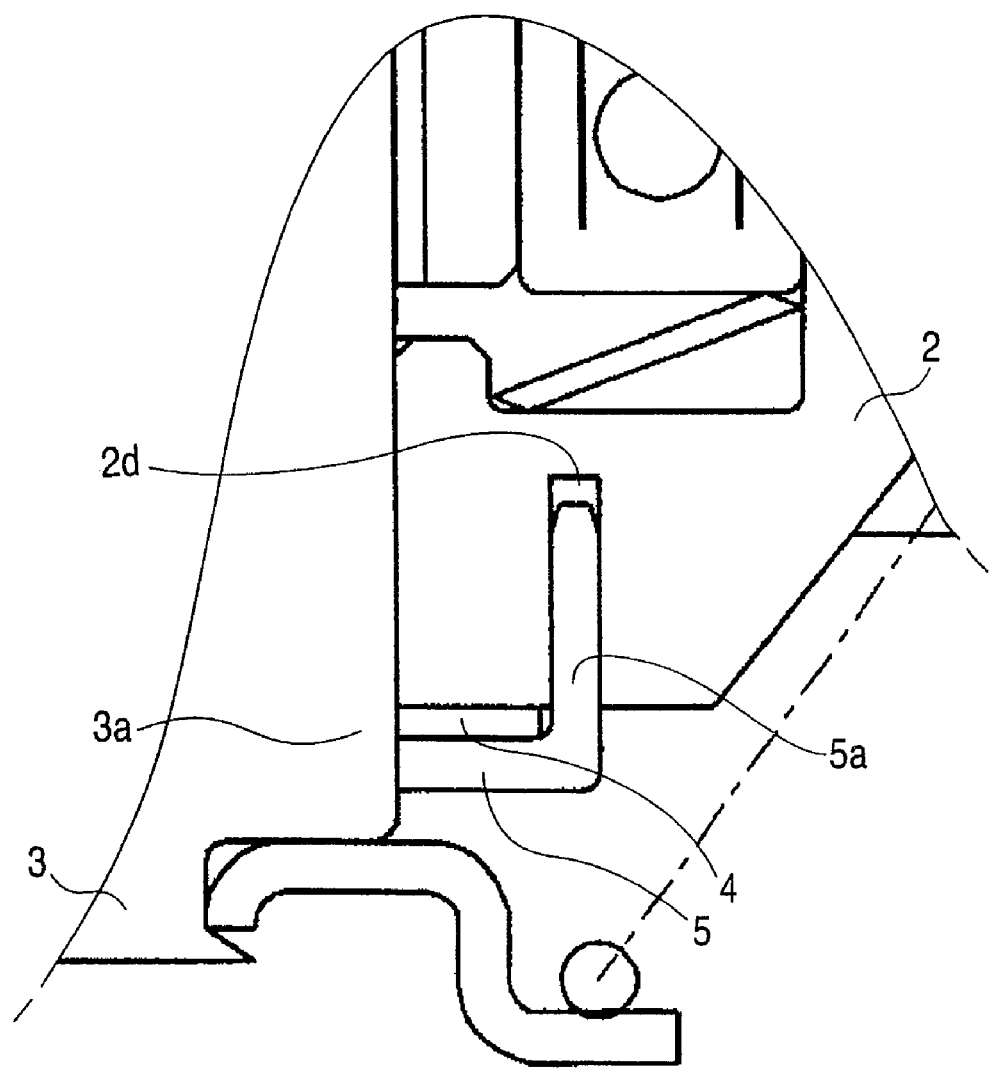

FIG. 3A
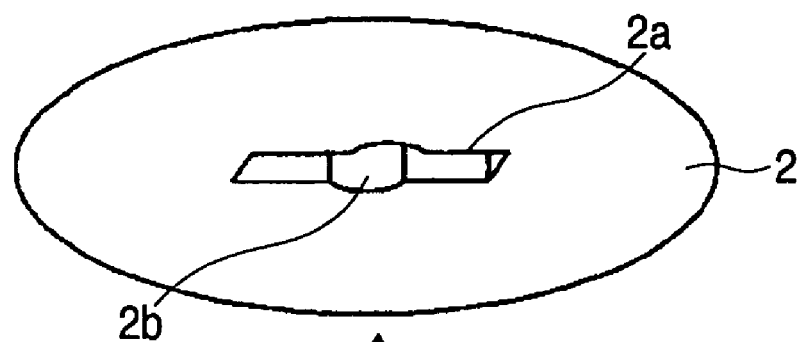
FIG. 3B
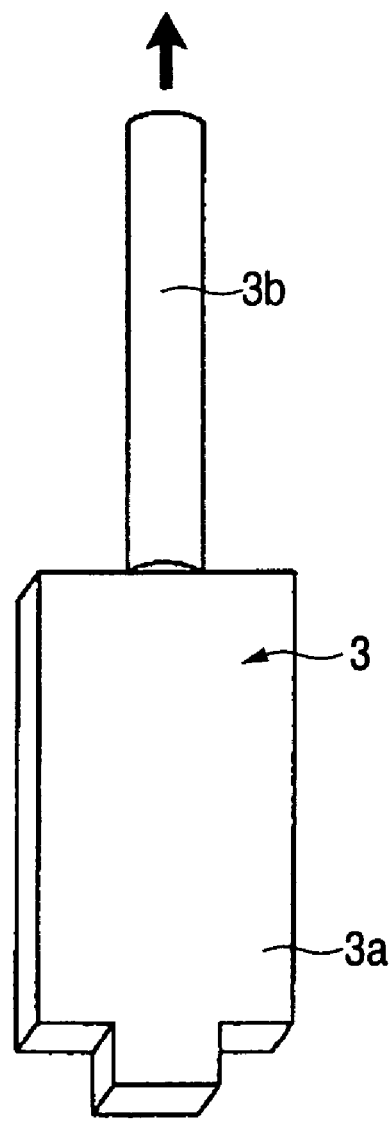
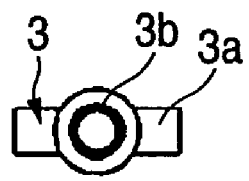
VIEWED FROM ABOVE

FIG. 4
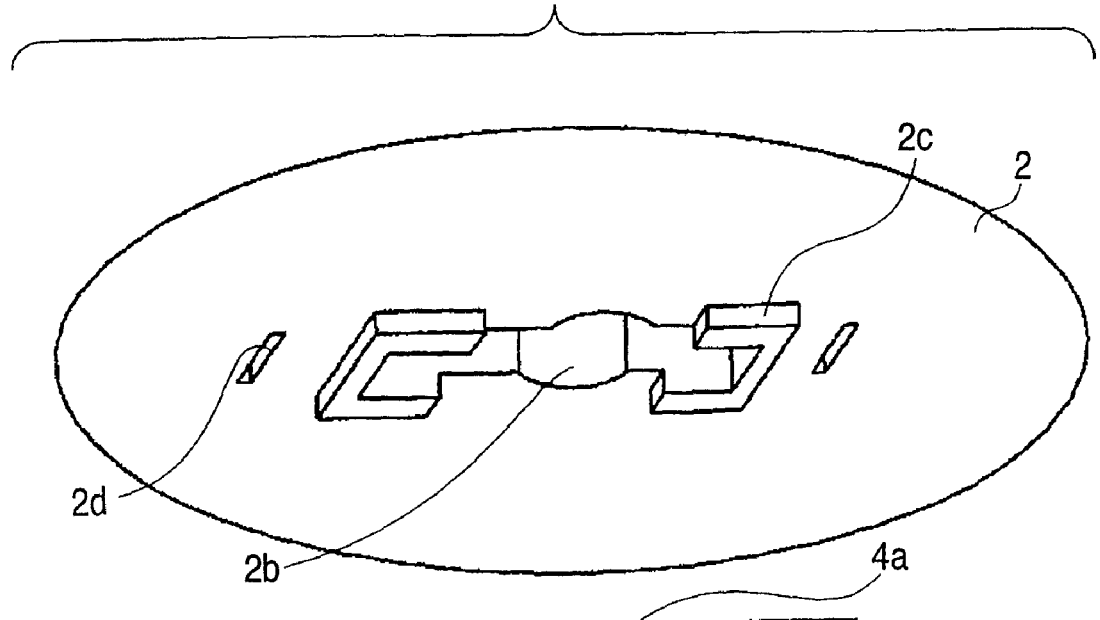
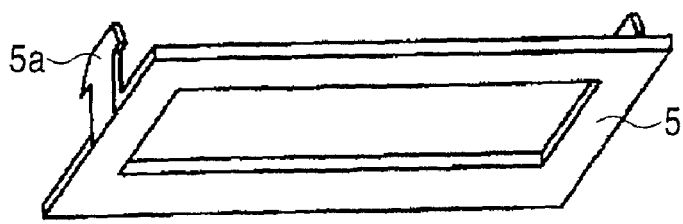

FIG. 6A
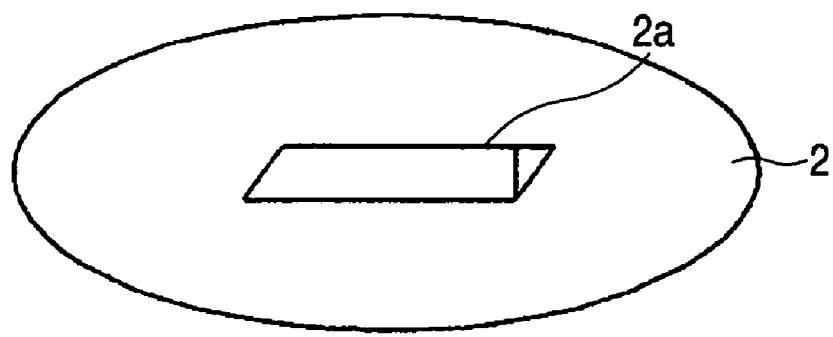
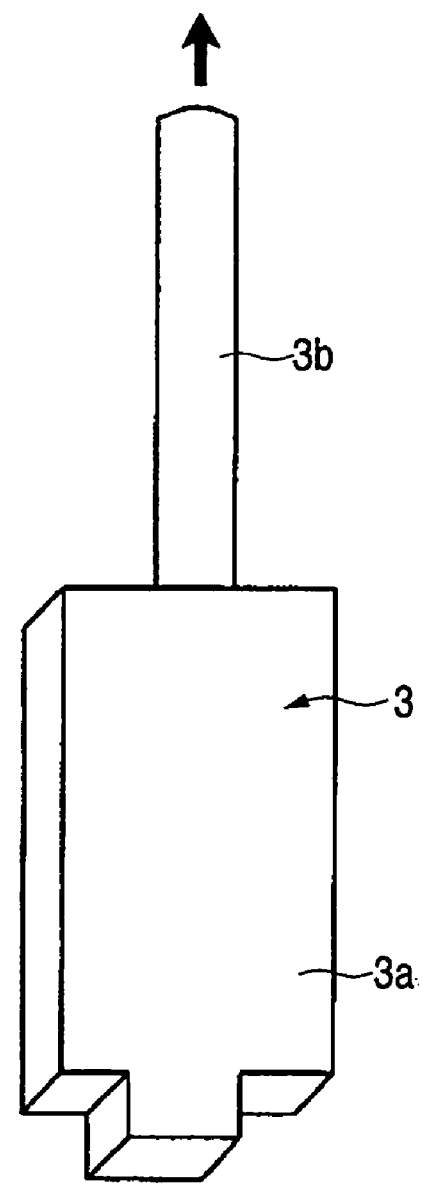
FIG. 6B
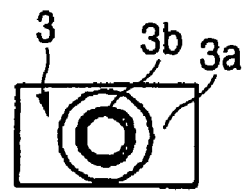
VIEWED FROM ABOVE

MOTOR WHICH PERFORMS A ROTATIONAL-TO-LINEAR MOTION CONVERSION

CROSS-REFERENCE TO RELATED APPLICATION

This application is a Divisional of U.S. application Ser. No. 10/893,317 filed Jul. 19, 2004 now U.S. Pat. No. 7,205,690; the above-noted application incorporated herein by reference in its entirety.

BACKGROUND OF THE INVENTION

1. Field of the Invention

The present invention generally relates to a current-driven motor, and more particularly to a motor for performing a rotational-to-linear motion conversion on rotation of a rotor provided in a motor to cause an output shaft of the motor to perform a linear motion.

2. Description of the Related Art

A related motor is configured so that a portion, through a screw portion of a sliding shaft is passed, is provided in a sliding hole of a regulating portion, which regulates rotation of an output shaft and that slides the output shaft, and opened to the outside of the motor.

Also, a stopper provided in a part of a resin rotor is made to abut against the output shaft so as to stop an axial movement of the output shaft.

Also, a spring holder for supporting a spring, which pushes the output shaft in the direction of a rotor, has a necessary minimum size for supporting the spring in such a way as not to hinder the movement of the output shaft.

Moreover, a coil wire is supported by caulking a part of each of terminals and also fixed to the terminals by being welded thereto.

[Patent Document 1]
JP-A-7-55012
[Patent Document 2]
JP-A-7-274472
[Patent Document 3]
JP-A-6-141502

Because the related motor is configured so that a portion, through a screw portion of a sliding shaft is passed, is provided in a sliding hole of a regulating portion, which regulates rotation of an output shaft and that slides the output shaft, and opened to the outside of the motor, foreign substances, moisture, gas and so on enter the inside of the motor and bring about performance deterioration thereof.

Also, because the stopper provided in a part of a resin rotor is made to abut against the output shaft so as to stop an axial movement of the output shaft, the rotor is broken by an impact force exerted thereon. Such a broken part becomes a foreign matter and brings about performance deterioration of the motor.

Also, because the spring holder for supporting a spring, which pushes the output shaft in the direction of a rotor, has a necessary minimum size for supporting the spring in such a way as not to hinder the movement of the output shaft, foreign substances, moisture, gas and so on enter the inside of the motor through surrounding areas of the spring holder and bring about performance deterioration thereof.

Moreover, although the coil wire is supported by caulking a part of each of terminals and also fixed to the terminals by being welded thereto, when the coil wire is hung on the terminals, hung parts thereof are liable to be flawed. Thus, the coil wire becomes easy to be broken. Also, when plural coil wires are caulked together to the terminal, the areas of parts of the coil wires, which are brought into contact with the terminal, become small. Consequently, defects of welding are caused.

SUMMARY OF THE INVENTION

The invention is accomplished to solve the aforementioned problems. Accordingly, an object of the invention is to obtain a motor enabled to prevent foreign substances, moisture, gas and so on from entering the inside of the motor even when a portion, through a screw portion of a sliding shaft is passed, is provided in a sliding hole of a regulating portion, which regulates rotation of an output shaft and that slides the output shaft.

Another object of the invention is to provide a motor enabled to obtain a rotor from being broken by an impact force exerted thereon when an output shaft abuts against the rotor.

Another object of the invention is to obtain a motor enabled to prevent foreign substances, moisture, gas and so on from going thereinto through surrounding areas of a spring holder thereof.

Another object of the invention is to obtain a motor enabled to prevent flaws from being caused in a part of a coil wire when the part of the coil wire is hung on a terminal, and also enabled to bring plural coil wires into sufficient contact with a terminal when the plural coil wires are caulked together to the terminal.

According to an aspect of the invention, there is provided a motor that comprises a stator provided with a coil to be supplied with electric current, a rotor adapted to rotate in the stator and provided with a magnet, an output shaft having a screw portion to be screwed into a threaded hole provided in the rotor, a regulating portion for axially moving the output shaft by regulating rotation of the output shaft and for sliding and holding the output shaft, and a sliding portion, provided in the output shaft and adapted to slide in a sliding hole provided in the regulating portion. The sliding hole is formed in such a way as to permit a screw portion to pass therethrough. A seal member is provided at a portion, through which the screw portion placed in the sliding hole is permitted to pass and in which the sliding portion does not slide.

According to another aspect of the invention, there is provided a motor that comprises a stator provided with a coil to be supplied with electric current, a rotor adapted to rotate in the stator and provided with a magnet, an output shaft having a screw portion to be screwed into a threaded hole provided in the rotor, a regulating portion for axially moving the output shaft by regulating rotation of the output shaft and for sliding and holding the output shaft, and a sliding portion, provided in the output shaft and adapted to slide in a sliding hole provided in the regulating portion. The sliding portion is larger in cross-section than the screw portion.

According to another aspect of the invention, there is provided a motor that comprises a stator provided with a coil to be supplied with electric current, a rotor adapted to rotate in the stator and provided with a magnet, an output shaft having a screw portion to be screwed into a threaded hole provided in the rotor, a regulating portion for axially moving the output shaft by regulating rotation of the output shaft and for sliding and holding the output shaft, a sliding portion, provided in the output shaft and adapted to slide in a sliding hole provided in the regulating portion, a pushing member for pushing the output shaft in a direction of the rotor, a plate, fixed to the output shaft, for supporting the pushing member, and an accommodating member in which the plate and the output shaft are displaceably accommodated. An extension portion extended from a support portion of the plate, which supports the pushing member, toward a direction of an inner surface of the accommodating member is provided in the plate.

According to another aspect of the invention, there is provided a motor that comprises a stator provided with a coil to be supplied with electric current, a resin rotor adapted to rotate in the stator and provided with a magnet, an output shaft having a screw portion to be screwed into a threaded hole provided in the rotor, a regulating portion for axially moving the output shaft by regulating rotation of the output shaft and for sliding and holding the output shaft, a sliding portion, provided in the output shaft and adapted to slide in a sliding hole provided in the regulating portion, and a metallic stopper, provided in the rotor and adapted to abut against the output shaft, for axially regulating the output shaft.

According to another aspect of the invention, there is provided a motor that comprises a stator provided with a coil to be supplied with electric current, a rotor adapted to rotate in the stator and provided with a magnet, an output shaft having a screw portion to be screwed into a threaded hole provided in the rotor, a regulating portion for axially moving the output shaft by regulating rotation of the output shaft and for sliding and holding the output shaft, and a sliding portion, provided in the output shaft and adapted to slide in a sliding hole provided in the regulating portion, a terminal provided in the stator. A coil wire of a coil is fixed to the terminal. This motor also comprises a concave hook portion provided in the terminal. The coil wire is wound around the hook portion.

BRIEF DESCRIPTION OF THE DRAWINGS

These and other objects and advantages of this invention will become more fully apparent from the following detailed description taken with the accompanying drawings in which:

FIG. 2 is an enlarged view illustrating a portion indicated by a dot-dash line α in FIG. 1;

FIG. 3A is a perspective view illustrating a boss 2 and an output shaft 3 of a comparative example so as to explain the first embodiment. FIG. 3B is a top view illustrating the output shaft 3 shown in FIG. 3A;

FIG. 4 is a perspective view illustrating members used for shaft seal;

FIG. 6A is a perspective view illustrating a boss 2 and an output shaft 3 of the third embodiment. FIG. 6B is a top view illustrating the output shaft 3 shown in FIG. 6A;

DETAILED DESCRIPTION OF THE PREFERRED EMBODIMENTS

First Embodiment

Hereinafter, a first embodiment of the invention is described.

Figure 1:
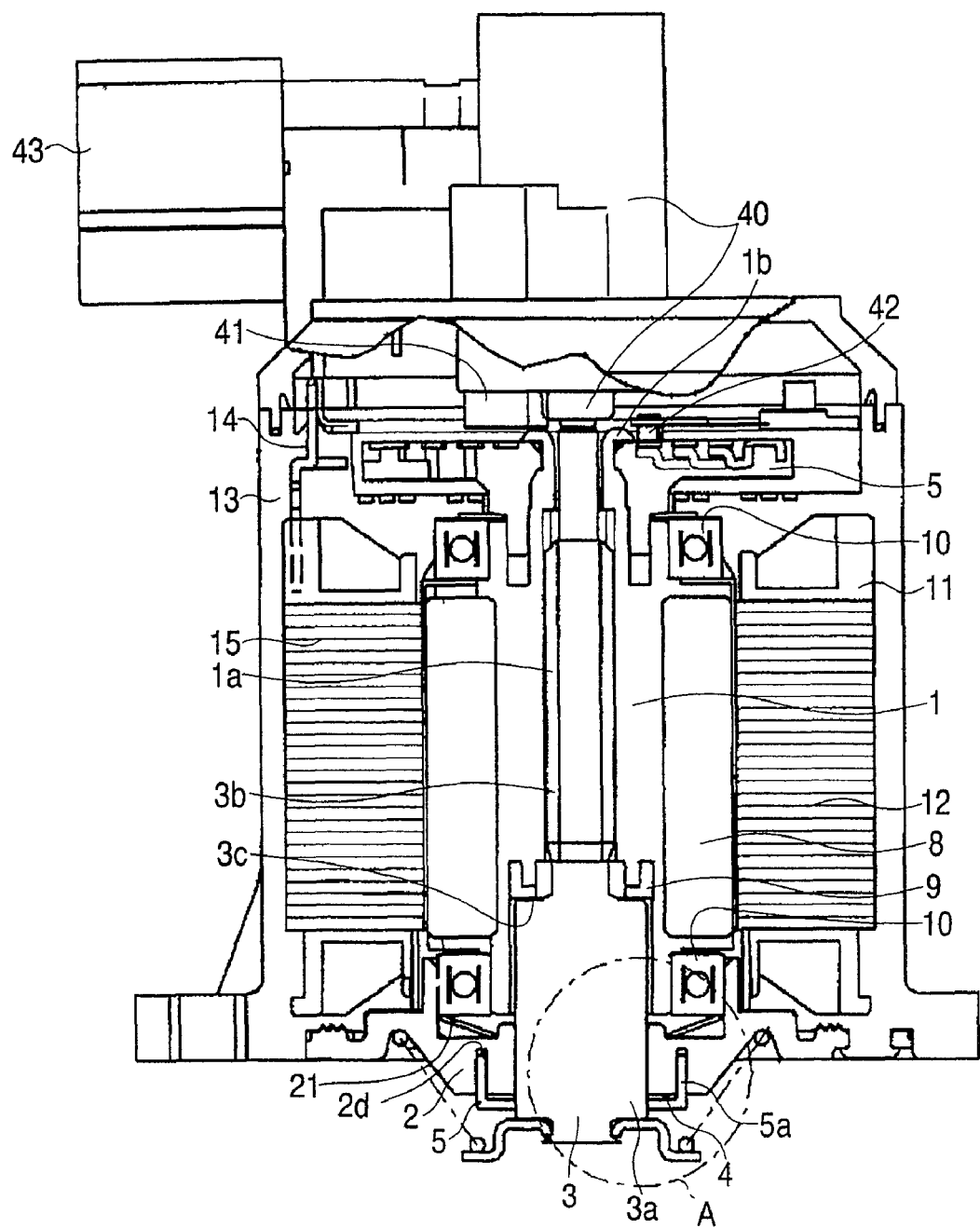
FIG. 1 is an axially sectional view illustrating an electric motor that is a first embodiment of the invention.

FIG. 1 is an axially sectional view illustrating a DC (direct current) electric motor according to the first embodiment of the invention.

In the motor shown in this figure, a rotor 1 uses a PPS resin. A threaded hole portion 1a is provided in a central shaft portion thereof. A rotation-stop sliding portion 2a (a regulating portion) is formed into a shape having a flat face.

Reference numeral 3 designates an output shaft. Reference numeral 3a denotes an output shaft sliding portion. Reference numeral 3b designates a screw disposed at the side opposite to the output end of the output shaft 3. This screw 3b meshes with and is inserted into the threaded hole portion 1a provided in the rotor 1. The output shaft sliding portion 3a provided in the output shaft 3 penetrates through the rotation-stop sliding portion 2a provided in the boss 2 and is formed into a shape having a flat face engaging with the rotation-stop sliding portion 2a.

When the rotor 1 is rotate-driven, torque thereof is transmitted to the output shaft 3 through the threaded hole portion 1a and the screw 3b. However, the engagement between the output sliding portion 3a and the rotation-stop sliding portion 2a prevents rotation of the output shaft 3. Thus, the torque of the rotor 1 is converted to an axial linear motion force owing to the presence of the screw portion 3b and the rotation-stop sliding portion 2a, which engage with each other in the rotor 1. That is, the screw portion 3b and the rotation-stop sliding portion 2a constitute a rotational-to-linear motion conversion mechanism.

FIG. 3A is a perspective view illustrating a boss 2 and an output shaft 3 of a comparative example so as to explain the first embodiment. FIG. 3B is a top view illustrating the output shaft 3 shown in FIG. 3A. As shown in FIGS. 3A and 3B, usually, the screw portion 3b is larger than the output shaft sliding portion 3a. Thus, a hole 2b, which is larger than the output shaft sliding portion 3a, is opened to the boss 2 so as to pass the screw portion 3b, which is provided in the output shaft 3, through the boss 2 when the output shaft 3 is assembled to the motor.

As shown in FIG. 1, in this embodiment, the hole 2b is covered with a seal 4 so as to block up the hole 2b. Then, the seal 4 is held by a plate 5, which is fixed to the boss 2 by being press-fitted thereto.

FIG. 2 is an enlarged view illustrating a portion indicated by a dot-dash line α in FIG. 1. FIG. 4 is a perspective view illustrating members used for shaft seal.

The hole 2b, which is larger than the output shaft sliding portion, is formed in the boss 2 and covered with a deformable (or flexible) seal portion 4a of the seal 4. At that time, the positioning of the seal 4 is performed by fitting and assembling convex portions 2c of the boss 2 to a positioning portion 4b of the seal 4. Then, the positioning portion 4b is covered with the plate 5. A claw portion 5a is press-fitted into a plate holding hole 2d of the boss 2, so that the plate 5 is fixed thereto. At that time, the dimensions of the seal 4a are set so that the seal 4a does not slide together with the sliding portion 3a of the output shaft 3. Thus, similarly to a case that the seal 2 is not attached thereto, no sliding resistance is provided to the sliding portion 3a. Incidentally, as a result of blocking up the hole 2b with the seal portion 4a formed of a deformable material, such as rubber, when the screw 3b is inserted, the screw 3b can be inserted in such a way as to push the seal portion 4a aside. Thus, the insertion of the screw 3b can easily be performed. The process of assembling the output shaft 3 to the rotor can easily be performed without being changed. Incidentally, during a normal operation other that the assembling of the output shaft 3 thereto, the screw 3b does not pass through the seal 4. Consequently, the screw 3b does not affect an operation of the motor.

Second Embodiment

Figure 5:
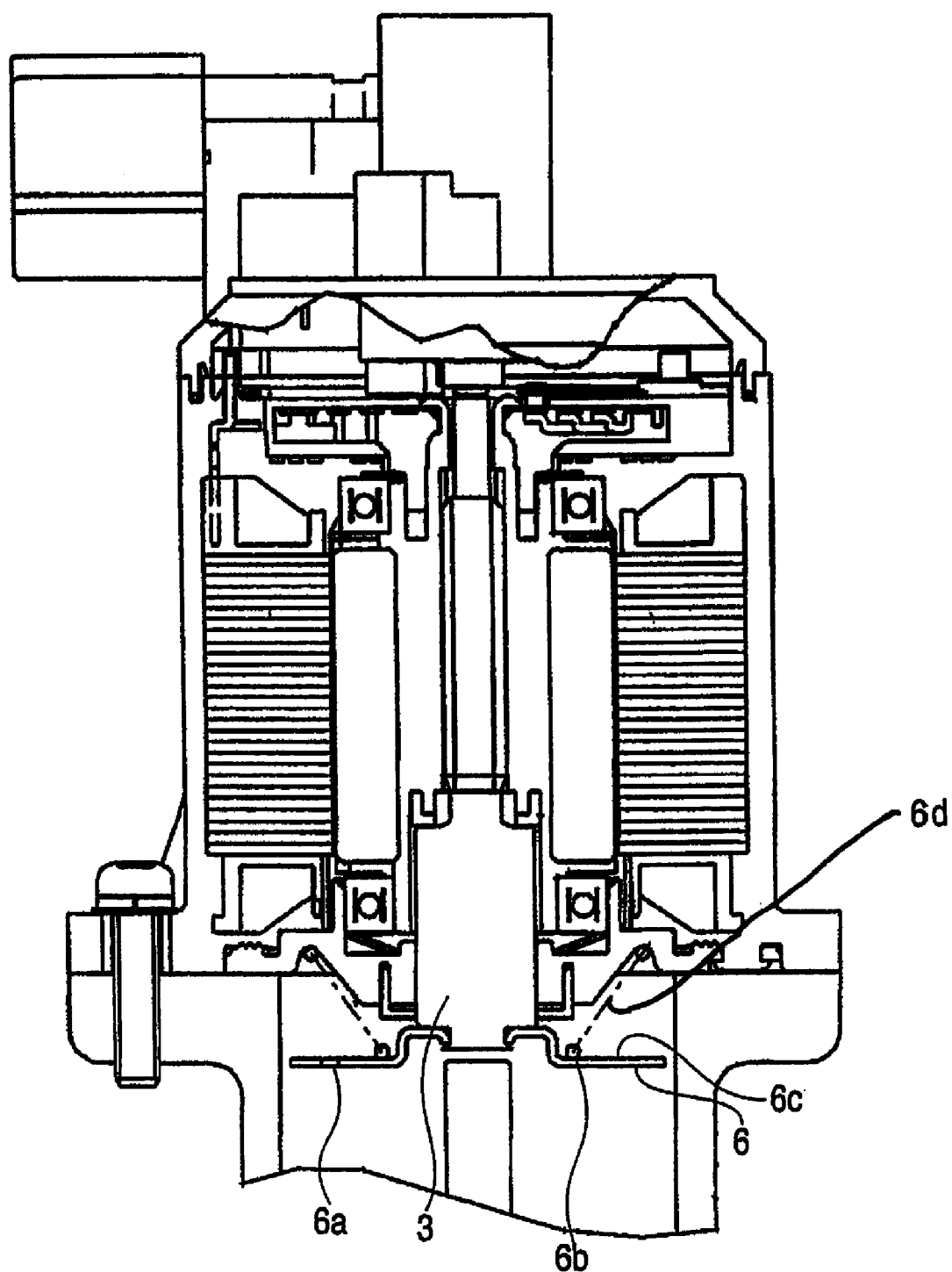
FIG. 5 is an axially sectional view illustrating an electric motor that is a second embodiment of the invention.

FIG. 5 is an axially sectional view illustrating an electric motor that is a second embodiment of the invention.

As shown in FIG. 5, a spring holder 6 attached to an output shaft 3 is shaped in such a manner as to be slightly smaller in inside diameter than a counterpart housing 7. Thus, airtightness can be ensured. In short, it is sufficient to provide an extension portion 6c in such a manner as to be extended outwardly from a portion 6b of the spring holder or plate 6, which holds a spring 6d. As shown in FIG. 5, the spring 6d is fastened to the spring holder or plate 6 and acts as a pushing member for pushing the output shaft 3 in a direction of the rotor 1. It is preferable for preventing the ingress of foreign substances that the gap between the extension portion 6c and the housing 7 is set to be as small as possible. Incidentally, a breathing hole 6a may be provided in a plate 6 in a case where the size of the hole 6a is set in consideration of airtightness. The provision of the breathing hole 6a therein results in the fact that obstruction to upward-downward motions of the plate 6 due to the difference in pressure between the top and the bottom of the plate 6 becomes hard to occur.

Third Embodiment

FIG. 6A is a perspective view illustrating a boss 2 and an output shaft 3 of the third embodiment. FIG. 6B is a top view illustrating the output shaft 3 shown in FIG. 6A.

As shown in FIGS. 6A and 6B, a screw portion 3b is formed in such a way as to be smaller than an output shaft sliding portion 3a. This eliminates the necessity for a hole 2b (as in FIG. 3A) to be created for passing the screw portion 3b, which is provided in the output shaft 3, through the boss 2. Thus, the output shaft sliding portion 3a can slide along a rotation-stop sliding portion 2a in a state in which airtightness is ensured.

The first to third embodiments have the following features.

A component for blocking up a gap opened so as to pass the screw portion, which is provided in the output shaft, at the assembling of the output shaft, which performs a linear motion, to the motor is attached to the motor. Thus, foreign substances, moisture, gases and so forth can be prevented from entering the inside of the motor. Consequently, the reliability of the motor is enhanced. Also, the dimensions of the component for blocking up the gap are set so that the component does not slide together with the output shaft. Thus, the motor can ensure performance, which is equal to that in a case in which the motor is not provided with the component for blocking up the gap.

Also, a rubber material is used as the material of the component for blocking up the gap. Consequently, when the output shaft is assembled to the motor, the rubber can be pushed aside by the output shaft screw portion. Thus, workability is enhanced by postponing the process of assembling the output shaft to the motor.

Also, the plate attached to the output shaft is shaped in such a manner as to be slightly smaller than a counterpart actuator. Thus, foreign matters, moisture, gasses and so on can be prevented from being entering the motor from the actuator.

Also, the sliding portion of the output shaft is formed in such a way as to be larger than the output shaft screw portion. Thus, a gap to be opened for passing the screw provided in the output shaft is not formed. Consequently, foreign substances, moisture, gasses and so on can be prevented from being entering the inside of the motor.

Fourth Embodiment

A fourth embodiment of the invention is further described by using FIG. 1.

Reference numeral 8 designates a permanent magnet. Reference numeral 9 denotes a plate. Reference numeral 10 designates each of bearings respectively provided on the top and the bottom of the rotor 1. Permanent magnets 8 divided into plural pole-pairs are disposed on the outer peripheral surface of the rotor 1. The bearings 10 are inserted to both end sides of a set of the permanent magnets 8. The rotor 1 uses a PPS resin. A threaded hole portion 1a is provided in a central shaft portion thereof. The permanent magnets 8, each of which is constituted by a ferrite magnet, and a plate 9, which serves as a stopper for the rotor 1, are integrally insert-formed on the outer peripheral surface of the rotor 1.

A commutator 5 is inserted and assembled to one of side surfaces of the rotor 1. One of the commutator 5 and the rotor 1 is partly or entirely plastic-deformed or heat-deformed (in this embodiment, at a caulking portion 1b) to thereby fix both of the commutator 5 and the rotor 1.

Reference numeral 15 designates a stator. Reference numeral 11 denotes a core. Reference numeral 12 designates a coil. Reference numeral 13 denotes a housing. Reference numeral 14 designates a motor terminal. The stator 15 is constituted by winding a three-phase coil around the core 11. The core 11 is disposed so that stator-side magnetic poles are formed outside the permanent magnets 8 of the rotor 1 by providing a predetermined gap therebetween. The housing 13 holds and fixes the stator 15. Also, the housing 13 encloses and supports the rotor 1 at a central portion thereof through the bearing 10.

Reference numeral 2 designates a boss. Reference character 2a denotes a rotation-stop sliding portion. Reference numeral 21 designates a preload spring. The boss 2 is assembled to one of sides of the housing 13. The preload spring 21 is disposed between the boss 2 and the bearing 10 that movably supports the rotor 1, and prevents axial displacement and wobbling of the rotor 1 by applying a predetermined pushing force to the rotor 1. The rotation-stop sliding portion 2a provided in the boss 2 is formed in such a way as to have a shape including a flat face. The boss 2 is assembled to and seals the housing 13, which accommodates the stator 15, in such a manner as to be able to maintain airtightness. The boss 2 is fixed thereto by screwing, heat-caulking or the like.

Reference numeral 3 designates an output shaft. Reference character 3a denotes an output shaft sliding portion. Reference character 3b designates a screw portion. Reference character 3c denotes an output shaft stopper. The screw portion 3b disposed at a counter-output side (that is, at a side opposite to a direction in which the output shaft 3 projects) of the output shaft 3 is inserted into the threaded hole portion 1a, which is provided in the rotor 1, in such a way as to mesh therewith. The output shaft sliding portion 3a provided in the output shaft 3 penetrates through the rotation-stop sliding portion 2a provided in the boss 2, and is shaped in such a way as to have a flat face that abuts against the rotation-stop sliding portion 2a.

Reference numeral 40 designates a position sensor formed in such a way as to be integral with a motor external terminal 43. Reference numeral 41 denotes a brush connected to the motor external terminal 43. Reference numeral 42 designates a brush connected to the motor terminal 14. The motor external terminal 43, which is formed in such a manner as to be integral with the position sensor 40, and the brush 41 are electrically connected to each other. The motor terminal 14 and the brush 42 are electrically connected to each other. The brushes 41 and 42 are electrically connected to the commutator 5 and form connection patterns, which are needed for driving the motor, on the commutator 5.

Therefore, energization is mechanically switched by the commutator 5 to the coil 12 thereby to rotation-drive the rotor 1. Torque of the rotor 1 is transmitted to the output shaft 3. Incidentally, rotation of the output shaft 3 is hindered by abutment between the output sliding portion 3a and the rotation-stop sliding portion 2a. Thus, the torque of the rotor 1 is converted to an axial linear motion force by the screw portion 3b and the rotation-stop sliding portion 2a, which engage with each other in the rotor 1.

The output shaft 3 is driven in this manner. When the output shaft 3 is retracted, the output shaft stopper 3c abuts against the stopper 9 of the rotor 1. Thus, the rotor can resist collision impact.

Figure 7:
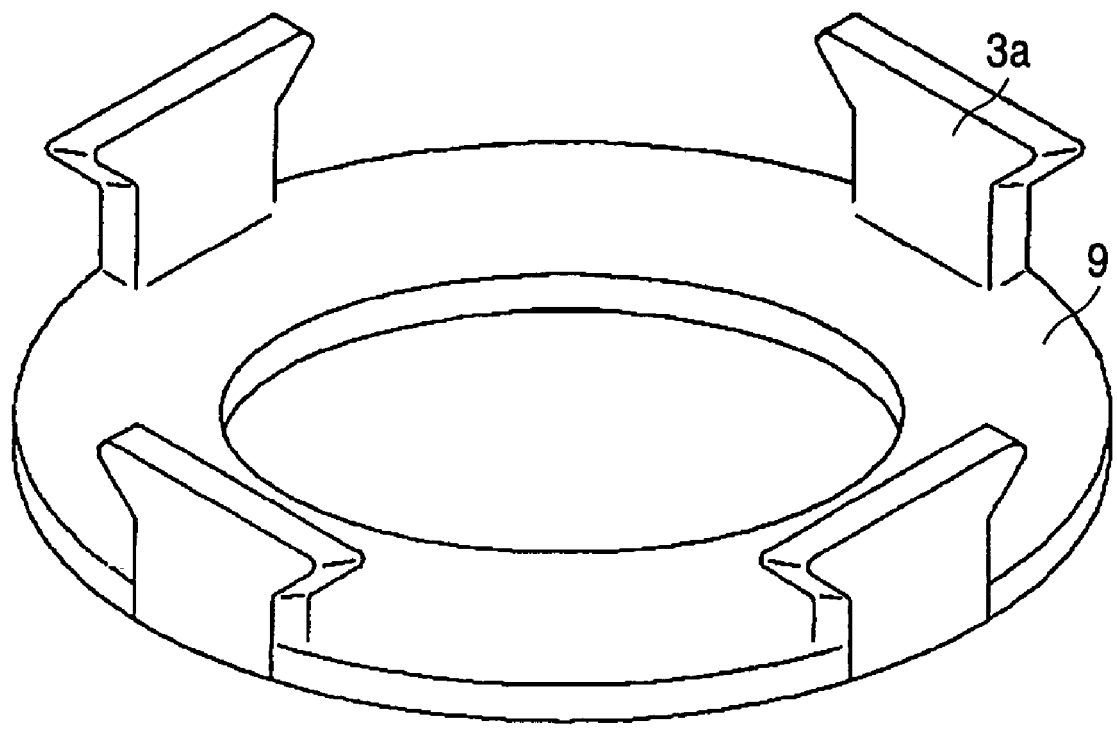
FIG. 7 is a perspective view illustrating the shape of a plate 9 provided with slip-off preventing parts.

FIG. 7 is a perspective view illustrating the shape of the plate 9 provided with slip-off preventing parts.

The rotor 1 is formed of a PPS resin and holds the plate 9 by insert-forming using the resin. Thus, the plate 9 is shaped, as illustrated in FIG. 7, so that the resin engages with a claw 3a, and that a holding strength in a slip-off direction is enhanced. Incidentally, in this embodiment, a leading end portion of the claw 3a is laterally projected. However, as long as the resin engages with the plate, each of the claws 3a may take any shape. The holding strength can be enhanced by increasing an amount of the resin engaged with the plate.

Figure 8:
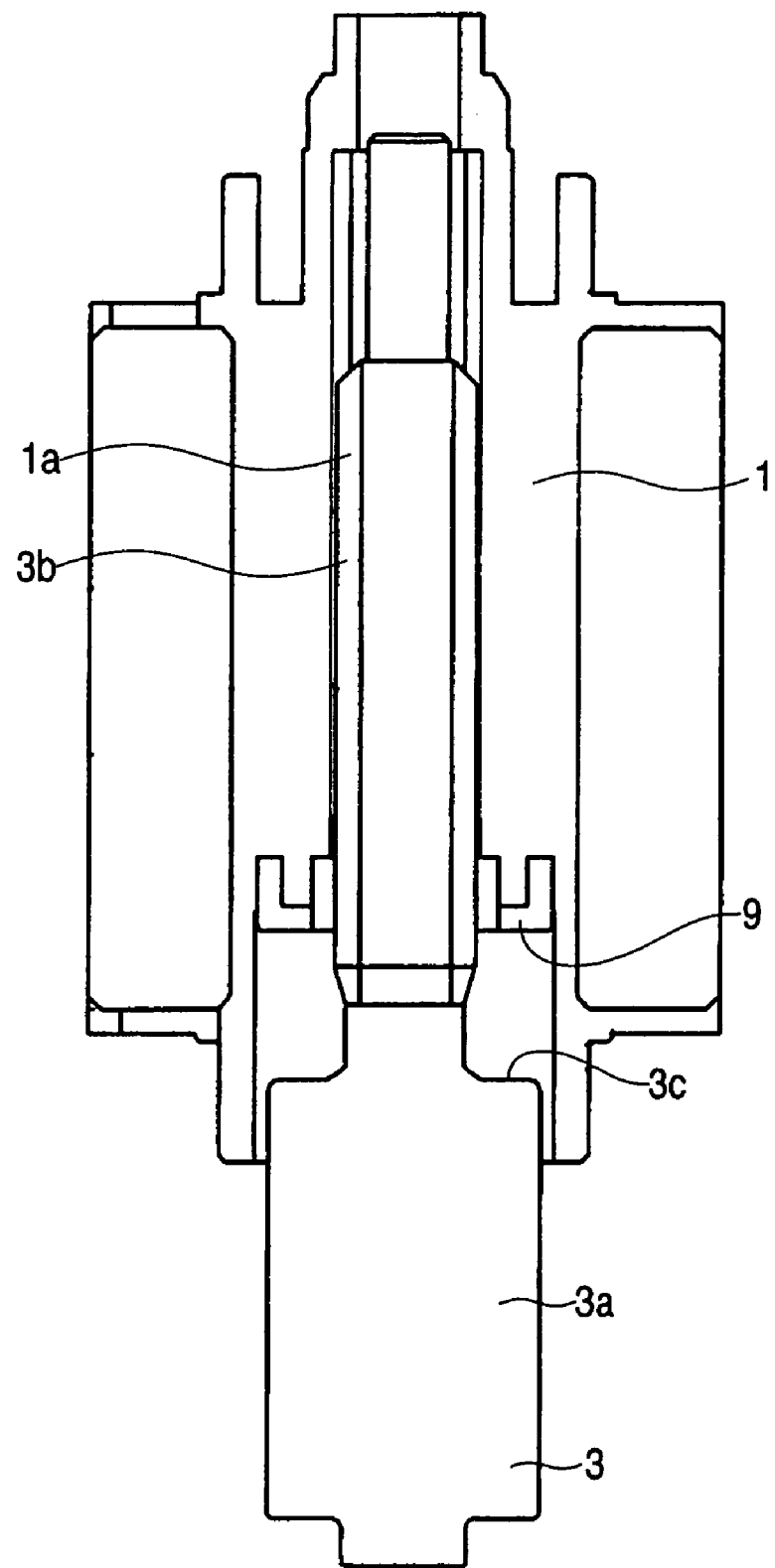
FIG. 8 is an explanatory view illustrating a rotor, an output shaft, and a plate shown in FIG. 1.

FIG. 8 is an explanatory view illustrating the rotor, the output shaft, and the plate shown in FIG. 1.

As shown in FIG. 8, the plate 9, which is provided in the rotor 1 and serves as a stopper, is disposed in such a way as to abut against the output shaft in the direction in which a linear motion thereof is performed. The plate 9 is shaped so that an abutting surface, on which the plate 9 abuts against the output shaft 3, is a flat face.

Fifth Embodiment

Figure 9:
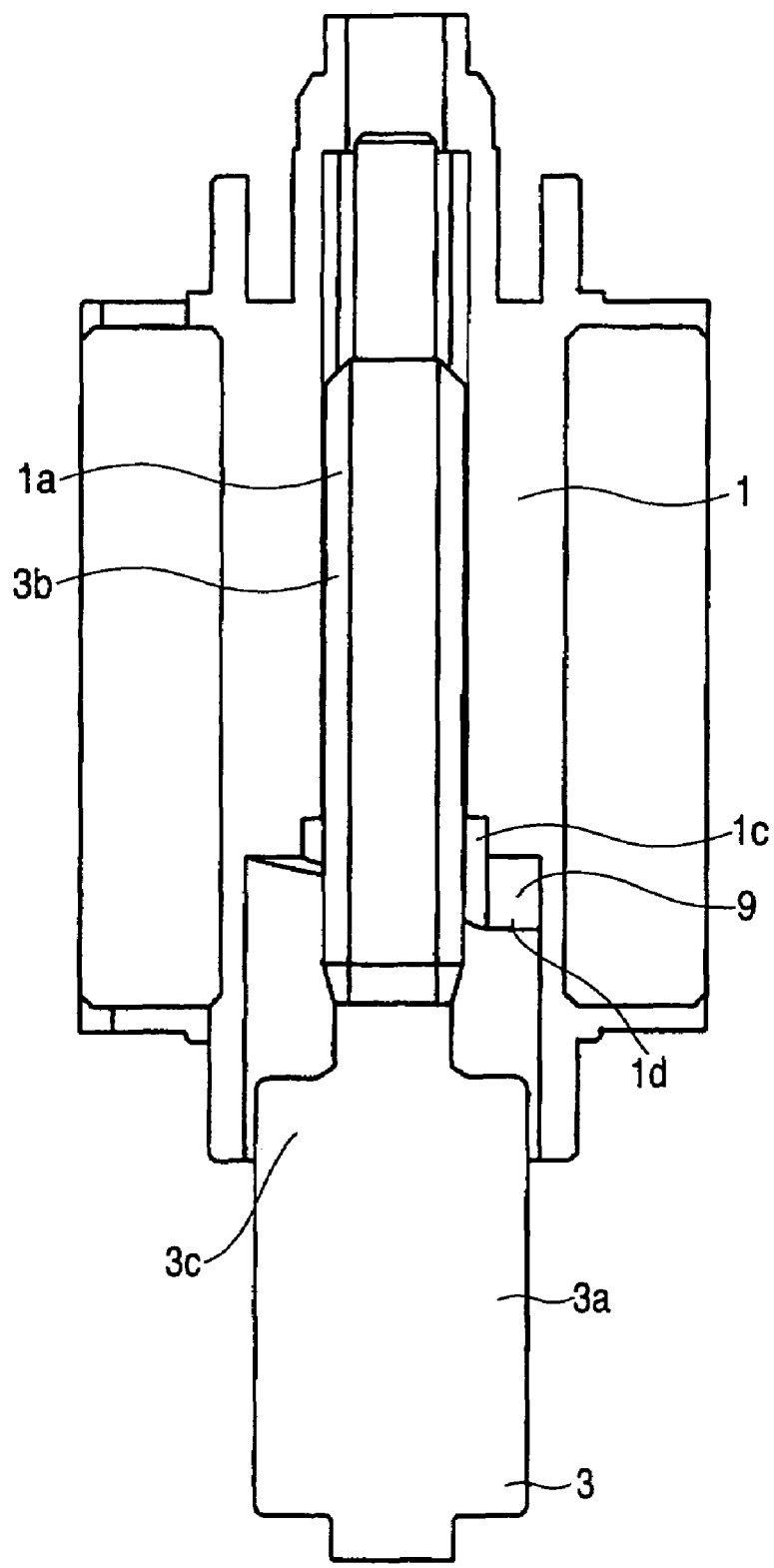
FIG. 9 is an explanatory view illustrating a rotor, an output shaft, and a plate.

FIG. 9 is an explanatory view illustrating a rotor, an output shaft, and a plate. As shown in this figure, the plate 9, which is provided in the rotor 1 and serves as a stopper, is disposed in such a way as to abut against the output shaft 3 in the direction of rotation. The plate 9 is shaped so that an abutting surface, on which the plate 9 abuts against the output shaft 3, is a flat face.

The plate 9 is attached to an end surface 1d in a rotating direction of the stopper 1c, which is provided in the rotor 1 and shaped in such a way as to form a slope like a semi-circular ring, by insert-molding or the like.

As the rotor 1 rotates, the plate 9 rotates and abuts against the output shaft stopper 3c of the output shaft 1 thereby to stop the output shaft 1.

Incidentally, in a case where the number of threads of the screw of the rotor differs from that of stopper surfaces, there are plural positions, at which the output shaft 1 may be stopped, in a structure shown in FIG. 9. However, in the case of the structure shown in FIG. 8, for any number of threads, there is only one position at which the output shaft may be stopped. Thus, an initial position (that is, a position at which the output shaft 1 is made to abut against the stopper) of the output shaft 1 is uniquely determined. This facilitates initialization of the position of the output shaft 1 to the initial position.

The forth and fifth embodiments of the invention have the following features.

When a rotor of a DC motor is manufactured by resin-molding, a metallic plate is insert-formed in the rotor as a stopper. Thus, endurance of the rotor against the impact of a collision thereof with the output shaft can be considerably enhanced.

Also, slip-off preventing parts are provided in the metallic plate. This strikingly enhances a plate holding strength.

Consequently, the invention can prevent the resin from being damaged and sticking by the collision thereof with the output shaft.

Also, the stopper is disposed in the direction of a linear motion instead of being disposed in the direction of rotation. Moreover, the stopper is shaped in such a way as to have a flat face. Thus, for any number of threads of the screw portion of the output shaft, the position, at which the output shaft is assembled, is uniquely determined. Thus, there is no necessity for replacing the output shaft, so that the workability is enhanced.

For example, in the case of the related art, in which the stopper of the rotor is disposed in the direction of rotation thereof and where the number of stopper surfaces differs from that of threads of the screw portion, there may be different positions, at which the output shaft is assembled thereto. Thus, the related motor needs reassembling of the output shaft thereto or equipment of an output shaft.

Sixth Embodiment

Figure 10:
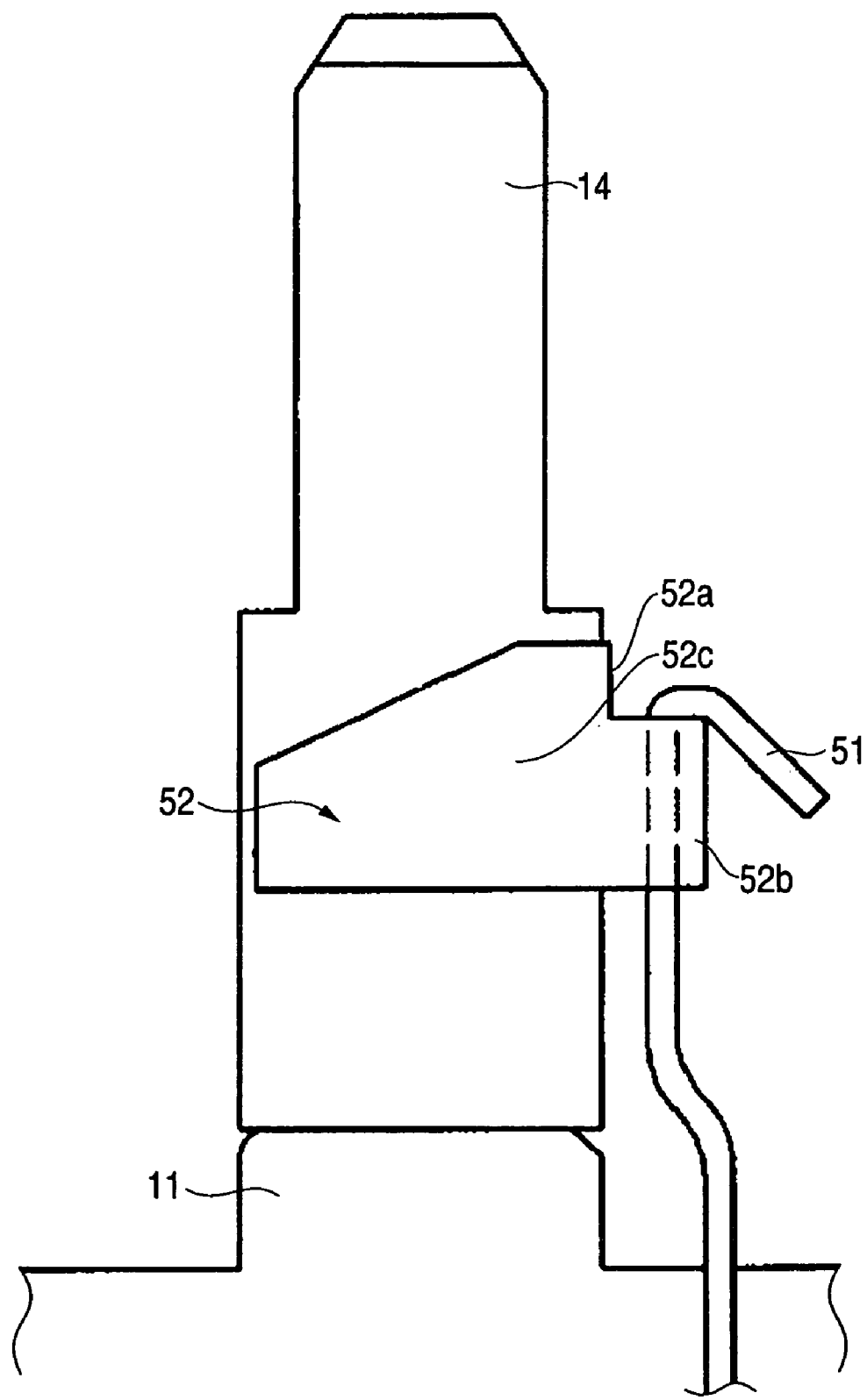
FIG. 10 is a side view illustrating a motor terminal portion of a sixth embodiment of the invention.
Figure 11:
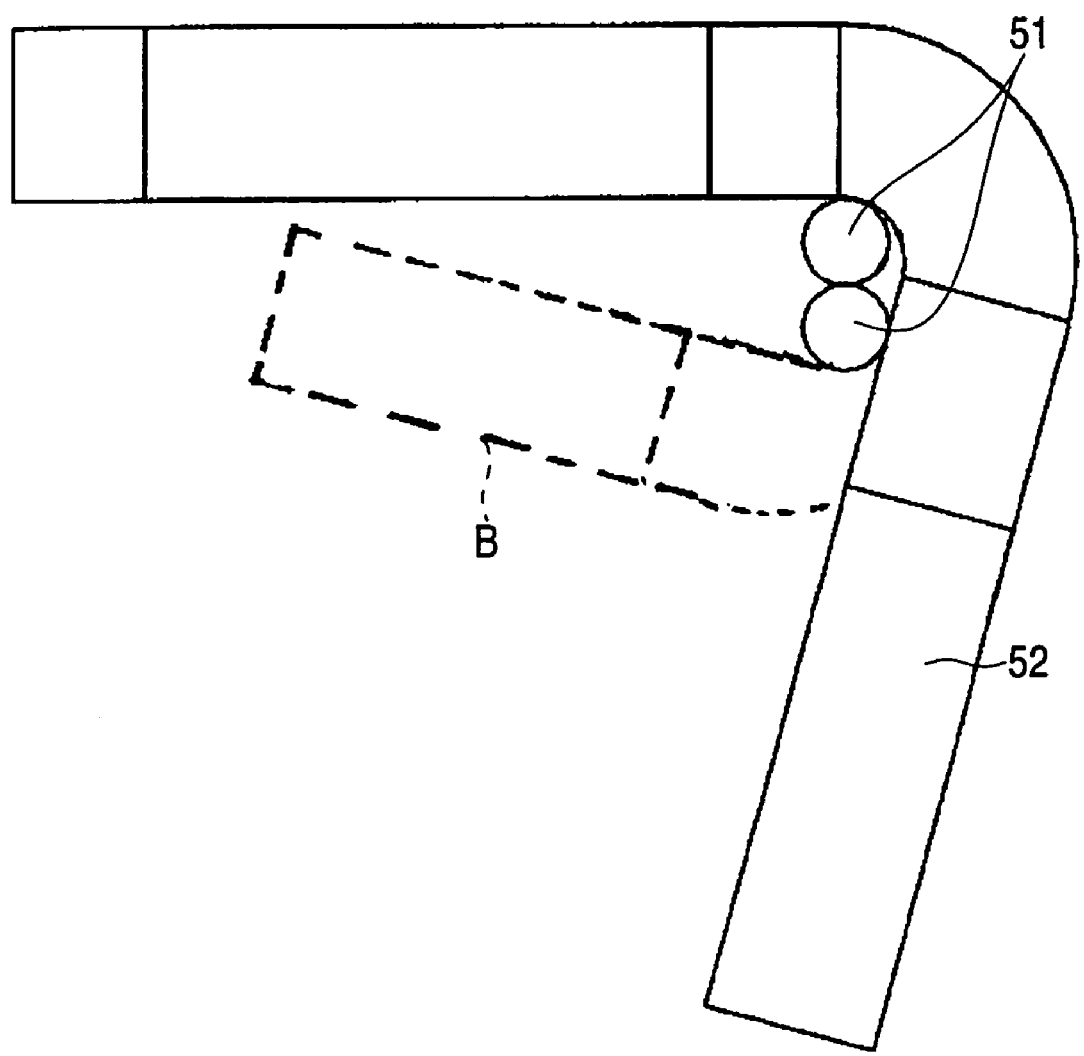
FIG. 11 is a view illustrating a comparative example so as to explain a coil wire fixing portion.
Figure 12:
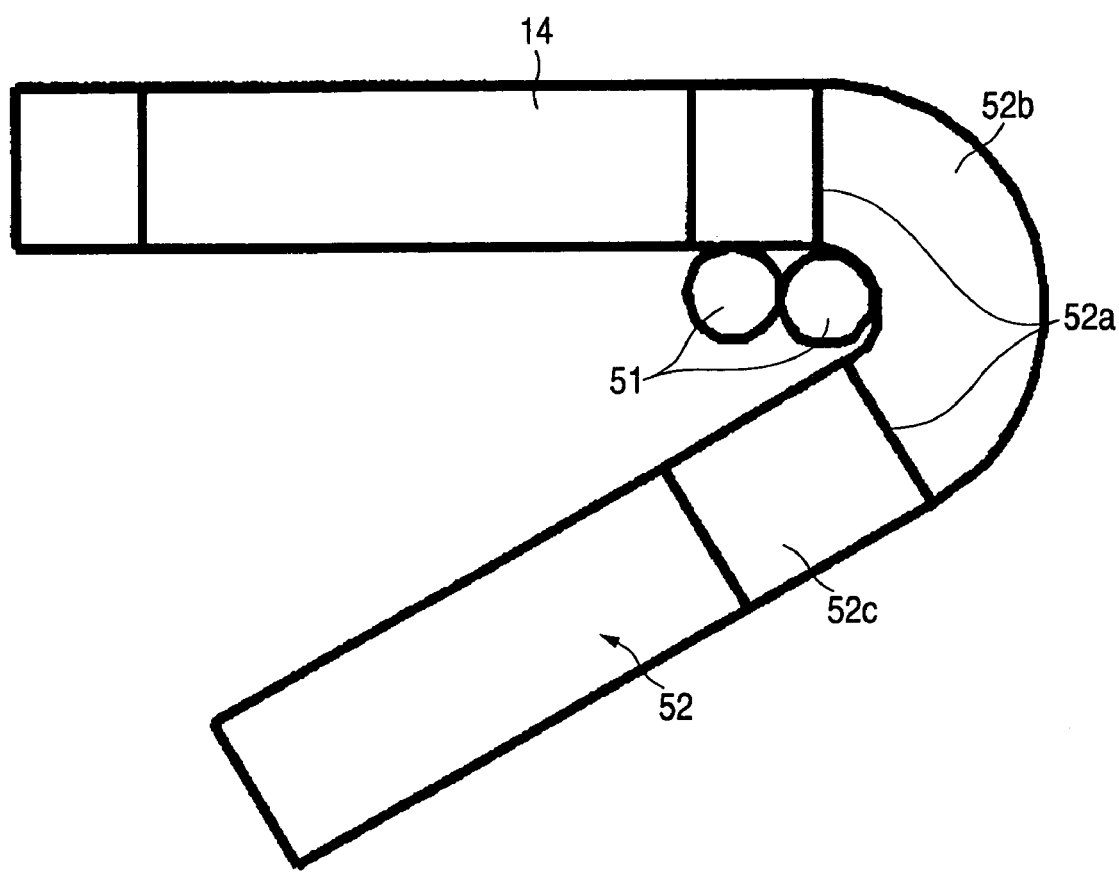
FIG. 12 is a top view illustrating the motor terminal portion.
Figure 13:
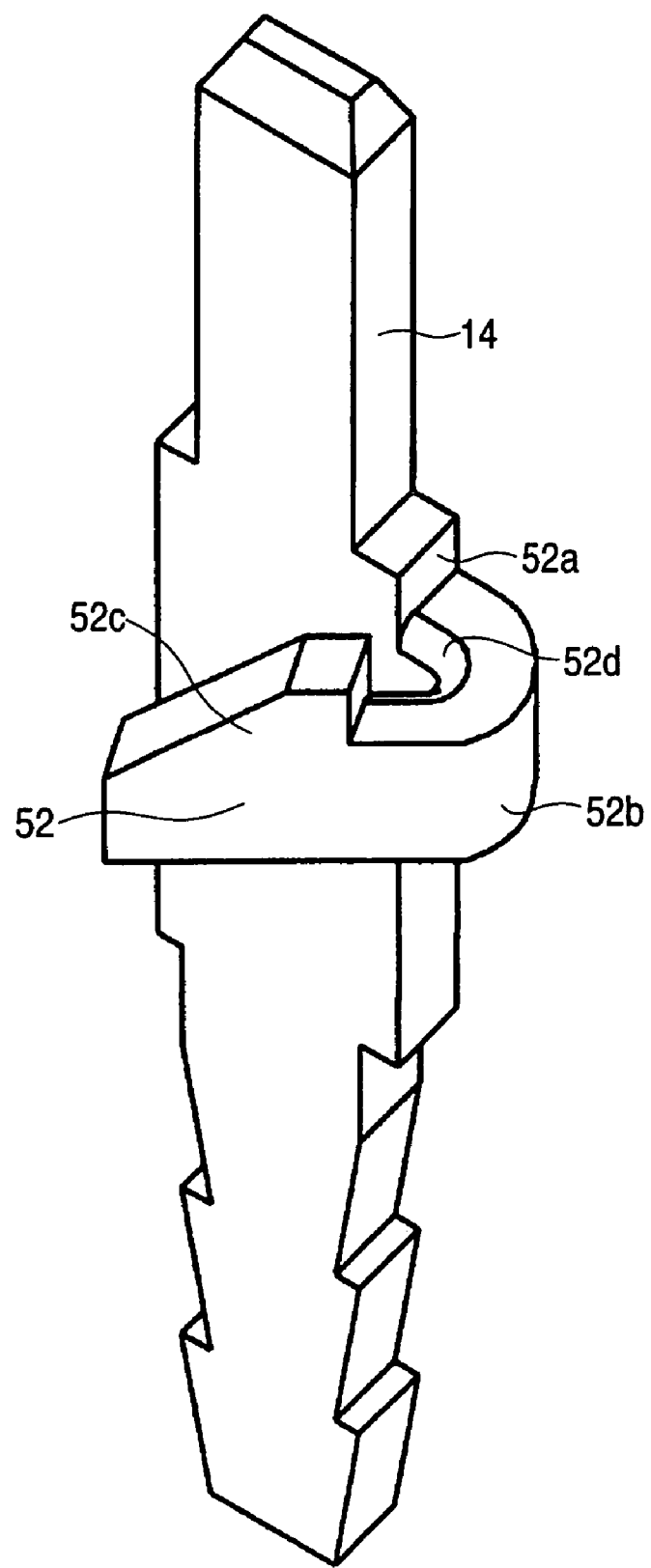
FIG. 13 is a perspective view illustrating the motor terminal portion.
Figure 14:
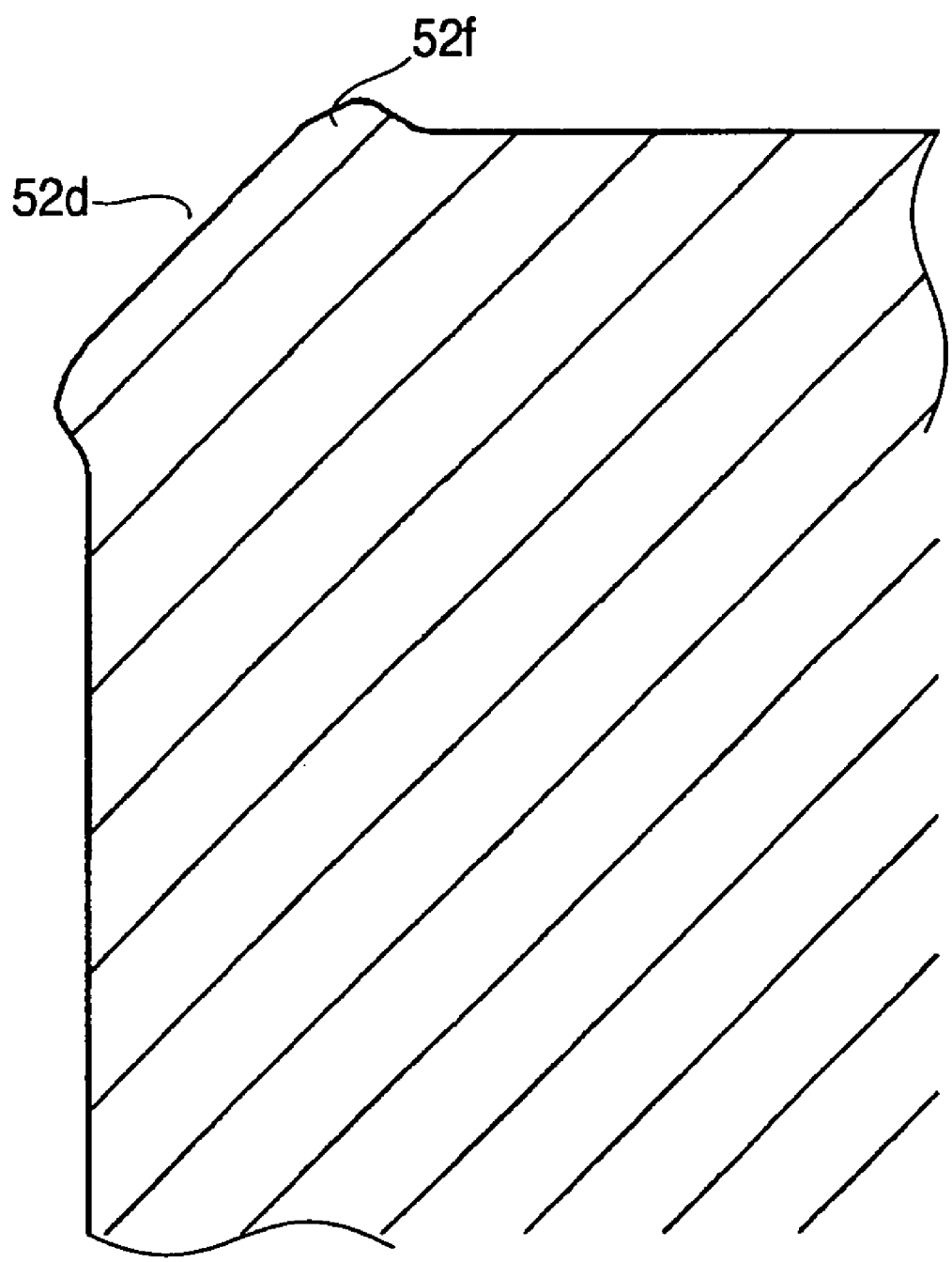
FIG. 14 is an explanatory view illustrating a shape of a surface of a hook portion.
Figure 15:
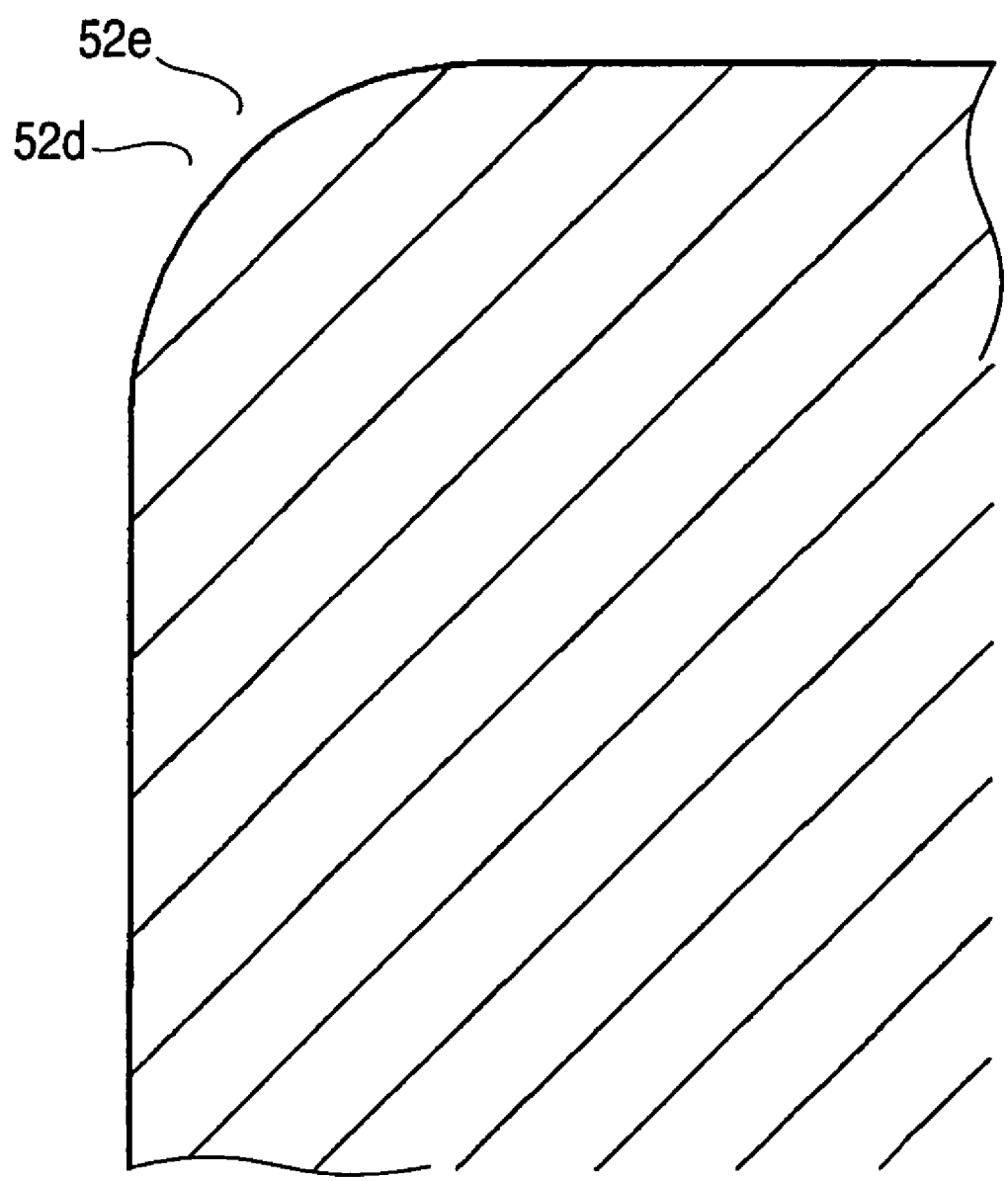
FIG. 15 is an explanatory view illustrating another shape of the surface of the hook portion.

FIG. 10 is a side view illustrating a motor terminal portion of this sixth embodiment of the invention. FIG. 11 is a view illustrating a comparative example so as to explain a coil wire fixing portion. FIG. 12 is a top view illustrating the motor terminal portion. FIG. 13 is a perspective view illustrating the motor terminal portion. FIGS. 14 and 15 are explanatory views illustrating shapes of a surface of a hook portion.

In these figures, reference numeral 14 designates a motor terminal. Reference numeral 51 denotes a coil wire. Reference numeral 11 designates a bobbin. The motor terminal 14 is press-fitted into a hole formed in the bobbin 11 (alternatively, insert-formed when the bobbin 11 is mold-formed) and fixed thereto.

As shown in FIG. 10, a stopper 52a for preventing displacement of a coil is provided in a coil wire fixing portion 52 of the motor terminal 14. The stopper 52a is adapted in such a manner as not to be displaced to the side of a fusing portion 52c and affect fusing after the coil wire 51 is engaged with a hook portion 52b. Incidentally, the stoppers 52a are provided on both sides of the hook portion 52b, which is formed into a concave shape.

Incidentally, after the coil wire 51 is hooked on the hook portion 52b, the coil wire fixing portion 52 is bent. Thus, the coil wire 51 is caught in the coil wire fixing portion 52. Then, fusing (resistance welding or the like) is performed on the fusing portion 52c. Consequently, the coil wire 51 is physically and electrically connected to the coil wire fixing portion 52.

When the coil wires 51 are wound around the motor terminal hook portion 52b, the two coil wires 51 may be caught therein in an overlaid manner (thus, the hook portion 52b is bent as indicated by dashed lines β in FIG. 11). This may affect fusing in the subsequent process (that is, a fusing failure may occur, and there is possibility of occurrence of a contact failure of the coil wires 51). Thus, as illustrated in FIG. 12, an initial bending width of the coil wire fixing portion 52 is set to be less than the thickness of the coil wire 51. Consequently, the coil wire fixing portion is set so that the two coil wires 51 are not overlaid.

As illustrated in FIG. 13, a tapered shape 52d is formed so that a nozzle of an automatic winding machine for introducing (or engaging) the coil wire 51 is easily moved when the coil wire 51 is engaged with the motor terminal 14.

When the coil wire 51 is wound around the hook portion 52b of the motor terminal 14 as shown in FIG. 13, preferably, the tapered shape 52d is formed by performing R-chamfering (Rounded-shape chamfering) 52e as shown in FIG. 15 for preventing the coil from being flawed. This is implemented by performing press working through the use of a jig having an R-surface.

Although the press working may be performed on this hook portion 52d by a planar jig as shown in FIG. 14, a material is moved by the press working at that time. Thus, this method has problems that a burr 52f is formed, and that the coil wire 51 is flawed. Therefore, a method of performing R-chamfering 52e, as illustrated in FIG. 15, is preferable.

This sixth embodiment also has the following features.

A stopper portion is provided so as to prevent displacement of the coil wire and ingress thereof into the fusing portion when the coil wire is connected to the motor terminal hook portion by performing fusing thereon after the coil wire is engaged with the hook portion (that is, after coil terminal processing). Thus, the connection therebetween is achieved by performing stable fusing without displacement of the coil wire and ingress thereof into the fusing portion. Consequently, a coil wire can be prevented from being displaced and causing a fusing failure.

When the coil terminal processing is performed on the coil wire at the motor terminal, a corner part of the fusing portion is formed into the tapered shape so as to facilitate the movement of the nozzle for introducing the coil wire. Thus, stable coil terminal processing is achieved. Also, a coil-terminal-processing time can be reduced. When the coil wire is wound around the hook portion as the coil terminal processing, a time taken to move the nozzle for introducing the coil wire can be decreased. Also, the nozzle can be prevented from being into contact with the hook portion and causing a failure of the terminal processing.

In a case where two coil wires are caught in a motor terminal hook portion when the coil wires are wound therearound, a fusing failure is liable to occur in the subsequent process. Thus, in consideration of a wire diameter of a coil wire, the hook portion is formed into a shape, which contains only one coil wire. Consequently, stable coil terminal processing is achieved. Also, when the coil wire is wound around the hook portion as the coil terminal processing, two coil wires are prevented from being caught therein in an overlaid manner and affecting the fusing.

The corner part of the motor terminal hook portion is chamfered so as to prevent the coil wire from being flawed when a coil wire is wound around the motor terminal hook portion. However, the motor terminal is manufactured in a press working process, so that the chamfering is performed thereon usually by pressing a chamfering face thereagainst through the use of a die. Then, the pressed material is displaced, so that a burr is produced. The R-chamfering is performed thereon so as to restrain a burr from being produced. Thus, a burr is restrained from being produced when a motor terminal is manufactured. Consequently, quality and workability can be enhanced. Also, a burr can be prevented from being produced and affecting the quality and the workability.

The motor according to the invention has the seal member provided at a portion, through which the screw portion placed in the sliding hole can pass and in which the sliding portion does not slide. Thus, foreign substances or the like can be prevented from entering the motor from the sliding hole.

Also, the sliding portion is larger in cross-section than the screw portion. Thus, foreign substances or the like can be prevented from entering the motor from the sliding hole.

Also, the extension portion extended from the support portion of the plate, which supports the pushing member, toward the direction of the inner surface of the accommodating member is provided in the plate. Thus, foreign substances or the like can be prevented from entering the motor through the surrounding areas of the plate.

Also, the motor according to the invention has the metallic stopper, which is provided in the rotor and which abuts against the output shaft and axially regulates the output shaft. Thus, even when the rotor is broken and such a broken part becomes a foreign matter, the foreign matter can be prevented from entering the motor.

Also, the concave hook portion, around which the coil wires are wounded, is provided in the terminal of the motor according to the invention. Thus, the coil wires can be prevented from being flawed when caulked to the terminal.

What is claimed is:

1. A motor comprising:
    a stator provided with a coil to be supplied with electric current;
    a rotor adapted to rotate in said stator and provided with a magnet;
    an output shaft having a screw portion to be screwed into a threaded hole provided in said rotor;
    a regulating portion for axially moving said output shaft by preventing rotation of said output shaft and for sliding and holding said output shaft;
    a sliding portion, provided in said output shaft and adapted to slide in a sliding hole provided in said regulating portion;
    a pushing member for pushing said output shaft;
    a plate, fixed to said output shaft, for supporting said pushing member; and an accommodating member in which said plate and said output shaft are displaceably accommodated, wherein an extension portion is provided in said plate to extend from a support portion of said plate, which supports said pushing member, toward a direction of an inner surface of said accommodating member, wherein said regulating portion is formed in a boss disposed at an end of said motor, and a seal member is provided on said boss to cover a portion of said sliding hole, such that said seal member has an opening with end portions that are larger than an intermediate portion of said opening.

2. The motor according to claim 1, wherein an air hole is provided in said plate.

3. The motor according to claim 1, wherein said pushing member comprises a spring.

4. The motor according to claim 1, wherein said pushing member comprises a spring which is fastened to said plate.

5. The motor according to claim 1, wherein said sliding hole comprises a rectangular opening corresponding to a shape of said sliding portion.

6. The motor according to claim 1, wherein opposite sides of said sliding portion slide against walls of said sliding hole in an airtight state.

7. The motor according to claim 1, wherein said sliding portion has a rectangular profile.

8. The motor according to claim 1, wherein said seal member is plate shaped.

9. The motor according to claim 1, wherein said seal member is maintained over said regulating portion by being mounted on protrusions which extend from said boss.

10. The motor according to claim 1, wherein a plate is disposed over said seal member such that said seal member is disposed between said plate and said boss.

11. The motor according to claim 10, wherein said plate includes projections which are inserted into slots of said boss.

12. The motor according to claim 11, wherein said protrusions are u-shaped and are disposed to face each another.

* * * * *